United States Patent
Canchi et al.

(10) Patent No.: US 9,881,641 B1
(45) Date of Patent: Jan. 30, 2018

(54) BURST WRITING FOR CLEARANCE CALIBRATION IN A HEAT ASSISTED MAGNETIC DATA RECORDING SYSTEM

(71) Applicant: Western Digital Technologies, Inc., Irvine, CA (US)

(72) Inventors: Sripathi Vangipuram Canchi, San Jose, CA (US); Erhard Schreck, San Jose, CA (US); Na Wang, San Jose, CA (US); Shaomin Xiong, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/396,235

(22) Filed: Dec. 30, 2016

(51) Int. Cl.
- *G11B 21/02* (2006.01)
- *G11B 5/60* (2006.01)
- *G11B 5/09* (2006.01)
- *G11B 5/00* (2006.01)

(52) U.S. Cl.
CPC ............... *G11B 5/607* (2013.01); *G11B 5/09* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 7,468,856 | B2 * | 12/2008 | Fitzpatrick | G11B 5/02 360/31 |
| 8,787,125 | B1 * | 7/2014 | Lee | G11B 5/6011 369/13.26 |
| 8,797,671 | B2 | 8/2014 | Ruiz et al. | |
| 8,873,353 | B1 | 10/2014 | Riddering | |
| 8,908,483 | B1 | 12/2014 | Ren et al. | |
| 9,159,360 | B2 * | 10/2015 | Shiroishi | G11B 20/1217 |
| 9,396,750 | B2 | 7/2016 | Chu et al. | |
| 9,472,225 | B2 | 10/2016 | Lou et al. | |
| 9,620,162 | B1 * | 4/2017 | Haralson | G11B 7/1263 |
| 2016/0232930 | A1 | 8/2016 | Lou et al. | |

* cited by examiner

*Primary Examiner* — K. Wong
(74) *Attorney, Agent, or Firm* — Foley & Lardner LLP (57) ABSTRACT

A method for magnetic data recording that calibrates for magnetic thermal protrusion of elements of a magnetic data recording system. The method involves performing a series of burst mode magnetic data writings using a magnetic recording head that includes a write element, a thermal fly height control element and a near field transducer. The burst mode writings are performed at various levels of thermal fly height control power. This can be use to determine the relationship between signal amplitude and thermal fly height control power with thermal protrusion being affected only by the thermal fly height control element and not from thermal heating of the near field transducer or write element. Then, thermal fly height control can be adjusted to achieve the desired signal amplitude for recording with the near field transducer and write element operating at a thermal steady state.

36 Claims, 11 Drawing Sheets

BURST WRITING FOR CLEARANCE CALIBRATION IN A HEAT ASSISTED MAGNETIC DATA RECORDING SYSTEM

FIELD OF THE INVENTION

The present invention relates to magnetic data recording and more particularly to non-destructive calibration of fly height clearance of a near field transducer in a heat assisted magnetic data recording system.

BACKGROUND

At the heart of many computer systems is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the reading and writing functions.

The write head includes at least one coil, a write pole and one or more return poles. When current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic media, thereby recording a bit of data. The write field then travels through a magnetically soft under-layer of the magnetic medium to return to the return pole of the write head.

Magnetoresistive sensors such as a Giant Magnetoresistive (GMR) sensors, Tunnel Junction Magnetoresistive (TMR) sensors or a scissor type magnetoresistive sensors have been employed to read a magnetic signal from the magnetic media. Such a magnetoresistive sensor has an electrical resistance that changes in response to an external magnetic field. This change in electrical resistance can be detected by processing circuitry in order to read magnetic data from the magnetic media.

As the need for ever higher data capacity drives a need for ever smaller magnetic bits, these magnetic bits can become thermally and magnetically unstable. One possible way to overcome this involves the use of heat assisted magnetic recording. Such a system uses a magnetic media that has a high magnetic anisotropy. While this high magnetic anisotropy makes the magnetic bits thermally and magnetically stable once a magnetic signal is written to the media, it also makes the media harder to write to, especially with the smaller write pole needed to write such as small magnetic bits. Heat assisted magnetic media can be used to temporarily, locally heat the magnetic media just at the point of writing. This temporarily lowers the magnetic anisotropy of the magnetic media, making it easier to write to. Once the magnetic media cools, the magnetic anisotropy of the magnetic media again increases, making the recorded magnetic bit magnetically and thermally stable.

SUMMARY

One embodiment of the present invention provides a method for magnetic data recording with fly height calibration. The method includes performing a first series of writings to a magnetic media using a magnetic head that includes a magnetic write element, a thermal fly height control element, and a near field transducer, with the first series of writings being performed in burst mode at a series of thermal fly height control element power settings. A calibration curve is generated based on the first series of burst writings. A second series of writings is performed at a thermal steady state. The thermal fly height control is then adjusted based on the first and second series of writings and the calibration curve so as to obtain a desired fly height at a thermal steady state.

The burst writing can be a writing that is performed for a short duration that is less than the NFT protrusion time constant. The NFT protrusion time constant is the time required for the near field transducer (NFT) to reach a thermal steady state. Preferably the burst writing can be performed for a duration that is about 10 percent of the NFT protrusion time constant or 5-15 percent of the NFT protrusion time constant. For example, the writing can be performed at a duration that is about 300 nanoseconds or 100-400 nanoseconds. The burst mode writing can also be performed for a duration that is less than the air bearing response time, which is the time required for the air bearing to reach steady state fly height.

A magnetic data recording system that employs heat assisted magnetic data recording and thermal fly height control can include a magnetic write element, a thermal fly height control element and a near field thermal transducer that is used to heat an adjacent magnetic media. Ideally, the clearance between the magnetic head and the adjacent magnetic media (fly height) would be controlled solely by the thermal fly height control element. However, in actual operation, heating from the near field thermal transducer heats the surrounding structure and results in its own extraneous thermal protrusion, which is called NFT protrusion. Similarly, heating from the writing transducer itself also produces its own thermal protrusion, which is called writer protrusion.

Burst writing can be used to calibrate thermal fly height control to achieve a desired fly height, such as near field thermal transducer clearance even in spite of the extraneous thermal protrusions from the near field transducer and from the write element itself. In burst writing mode, a series of writings are performed at durations that are so short that the near field transducer and write element do not significantly heat up. Therefore, this mode of writing does not include any significant thermal protrusion from either the near field transducer or the write element itself.

A calibration curve can be generated that plots signal amplitude versus thermal fly height control for burst writing. A desired target signal amplitude can then be found that corresponds to a desired fly height or near field transducer clearance. Once this signal amplitude is known, thermal fly height can be adjusted to achieve this same signal amplitude for steady state writing, thereby ensuring the same corresponding target fly height or near field transducer clearance at steady thermal state writing.

This process can be implemented in a magnetic data storage system that includes a magnetic media and a magnetic recording head that includes a read element, a write element, a near field transducer and a thermal fly height control element. The data recording element can also include circuitry or means for recording a signal to the magnetic media in a burst mode of writing, and circuitry or means for determining a relationship between signal amplitude and near field transducer clearance for the burst mode writing. The data recording system also includes circuitry or means for determining a desired target signal amplitude corresponding to a desired near field transducer clearance, and circuitry or means for adjusting fly height control to achieve the desired target signal amplitude when recording at thermal steady state.

In this way, the fly height can be non-destructively calibrated in real time for a magnetic data recording system. The calibration can also be performed for any set of operational conditions, including operating temperature, atmospheric pressure and even over the life time of the system to account for changed related to age of the magnetic data recording system.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
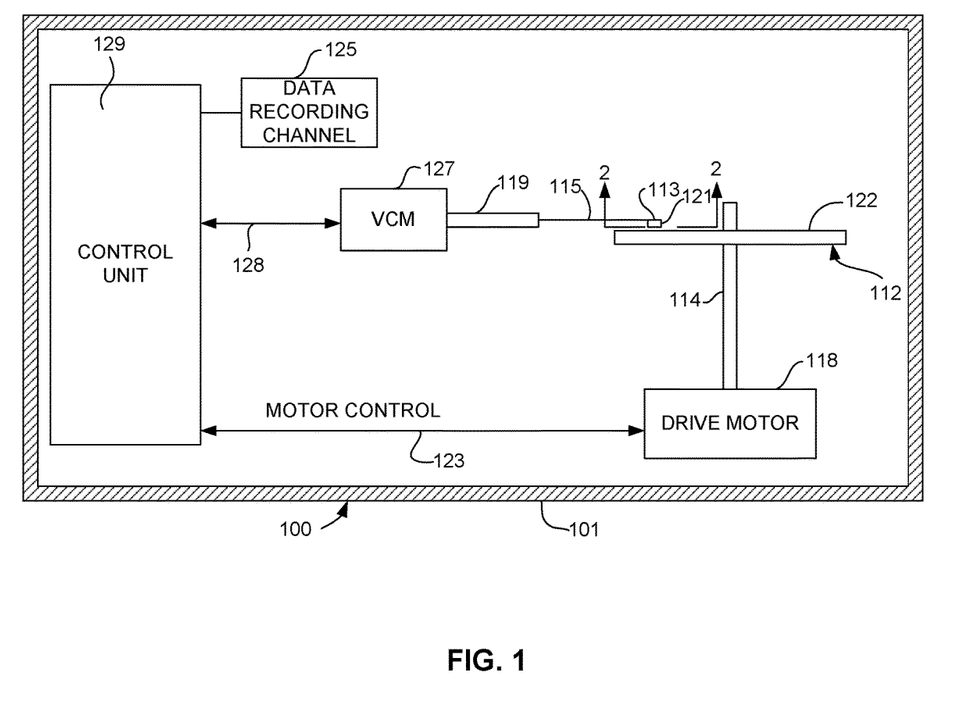
FIG. 1 is a schematic illustration of a disk drive system in which the invention might be embodied.

Referring now to FIG. 1, there is shown a disk drive/data storage system 100. The disk drive 100 includes a housing 101. At least one rotatable magnetic disk 112 is supported on a spindle 114 and rotated by a disk drive motor 118. The magnetic recording on each disk may be in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the control unit 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
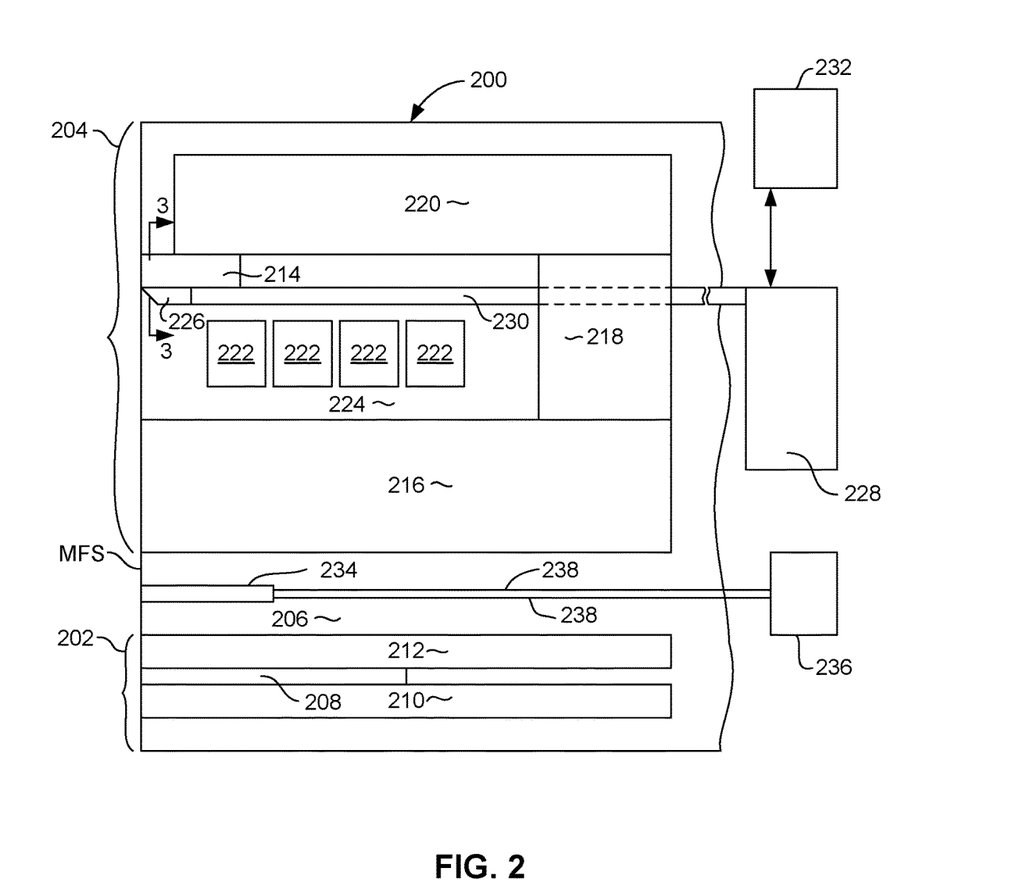
FIG. 2 is a side, cross sectional view of a magnetic read/write head for use in a magnetic data recording system.

FIG. 2 shows a side, cross sectional view of a magnetic read/write head 200 according to one possible embodiment of a heat assisted magnetic data recording system. The magnetic read/write head 200 includes a magnetic read element 202 and a magnetic write element 204. The magnetic read element can include a magnetoresistive sensor element 208 that can be sandwiched between first and second magnetic shields 210, 212. A non-magnetic fill material such as alumina 206 can fill the space between the shields 210, 212 and between the read and write elements 202, 204.

The write element 204 can include a magnetic write pole 214 that extends to a media facing surface MFS, and a magnetic return pole 216 that can also extend to the media facing surface MFS. The write element 204 can also include a trailing magnetic return pole 220. The write pole 214, return pole 216 and trailing return pole 220 can all be connected with one another by a magnetic back gap structure 218 located away from the media facing surface MFS.

The write element 204 also includes a magnetic write coil 222 that can be constructed of a non-magnetic, electrically conductive material such as Cu. The write coil 222 is shown in cross section in FIG. 2 and can be formed to pass between the magnetic return poles 216, 220. The write coil 222 can be embedded in a non-magnetic, electrically insulating material such as alumina 224. When an electrical current flows through the write coil 222, the resulting magnetic field from the write coil 222 causes a magnetic flux to flow through the write pole 214 and return poles 216, 220. A magnetic write field emits from the write pole 214 toward a magnetic media (not shown in FIG. 2) to write a bit of data thereon. The magnetic flux travels through the media to return to the return pole 216. The return pole 216 has a much larger area at the media facing surface than does the magnetic write pole 214, so that the magnetic write field returning to the return pole 216 is sufficiently weak and distributed that it does not erase the previously recorded bit.

As the need for ever increasing data density requires the recording of ever smaller magnetic bits, the recorded magnetic bits become ever more magnetically and thermally unstable. One way to make the magnetic bits more stable is to design the magnetic media to have a high magnetic anisotropy. However, this high magnetic anisotropy would also require higher magnetic write field to write to such a media. Producing such a high write field becomes even more challenging because of the smaller write pole needed to record such a small bit. One way to overcome this challenge is through the use of Heat Assisted Magnetic Recording (HAMR). In a heat assisted magnetic recording system, the magnetic media (not shown in FIG. 2) is locally, temporarily heated at or near the point of writing. This temporarily lowers the magnetic anisotropy of the magnetic media, making it easier to write to. After writing, the magnetic media cools so that the magnetic anisotropy again increases, making the recorded magnetic bit thermally stable.

To achieve this heating, a Near Field Transducer (NFT) 226 is located at or near the media facing surface MFS, adjacent to the magnetic write pole 214. A laser diode element 228 can be mounted at a back side surface of the slider at a location away from the media facing surface MFS. The laser diode 228 can be powered and controlled by circuitry 232. Light from the laser diode can be directed to the near field transducer NFT by a waveguide 230. The near field transducer can include a plasmonic antenna that can formed of a material such as gold (Au) and which focuses heat from the laser light to a very small point on the magnetic media (not shown).

One of the parameters that effects the performance of a magnetic read write head is height at which the magnetic read/write head flies over the surface of the magnetic media. This height is known in the industry as "fly height" and it directly affects the magnetic spacing between the write pole 214 and the recording layer of the magnetic media and also affects the magnetic spacing between the read sensor 208 and the recording layer of the magnetic media.

Generally, the lower the fly height is and smaller the magnetic spacing is, the better the performance of the magnetic recording system is. However, if the fly height is too low, there is a risk that some portion of the magnetic read/write head 200 will physically contact the media. This physical contact, which is known as a crash, can cause catastrophic damage to the magnetic read/write head as well as to the media. This can cause loss of data or even complete failure of the magnetic recording system.

Therefore, it is desirable to carefully control the height at which the read and write elements 202, 204 fly over the magnetic media. Tribological forces such as the air bearing surface design of the media facing surface MFS can only go so far in controlling the fly height during operation. However, thermal fly height control TFC can be used to adjust the fly height of the read and write elements 202, 204 during operation. To this end, the read/write head 200 can include a thermal fly-height control system that can include a heating element 234 that can be located at or near the media facing surface. The heating element 234 can be powered and controlled by circuitry 236 via leads 238.

As the heating element 234 heats up, it causes thermal expansion in the surrounding structures. This can cause the read sensor 208 and the write pole 214 to protrude outward, thereby reducing the effective fly height and magnetic spacing of these elements 208, 214.

Ideally, all of the thermal protrusion of the elements of the read/write head 200 would come only from the heating element 234 and would be controlled solely by the fly height control circuitry 236. However, in reality, other thermal factors come into play. For example, while the near field transducer 226 is designed specifically to heat only the magnetic media, some heating of surrounding structure and of the near field transducer 226 itself inevitably occurs. This heating can vary with the power applied to the laser diode 228 and can also vary between different magnetic recording systems and with different operating conditions.

In addition, the magnetic writing itself can cause some thermal protrusion. As electrical current flows through the write coil 222 (in order to initiate a necessary magnetic field), Joule heating of the write coil 222 causes thermal expansion of the write coil and surrounding structure, thereby resulting in writer induced thermal protrusion.

Figure 3:
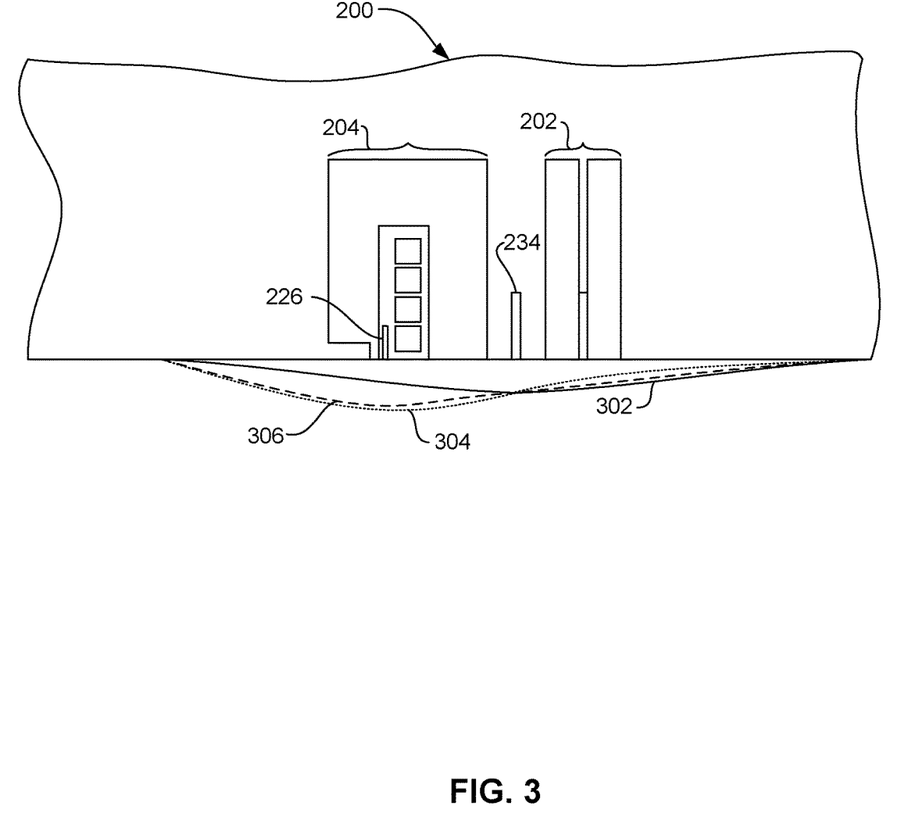
FIG. 3 is a an enlarged side, cross sectional view of a magnetic read/write head showing various protrusion modes of a media facing surface of the magnetic read/write head.

FIG. 3 illustrates how these various factors affect the thermal protrusion of the magnetic read/write head 200. FIG. 3 shows the magnetic read/write head 200 rotated 90 degrees counter-clockwise relative to the orientation shown in FIG. 2. In FIG. 3, the solid line 302 represents the thermal protrusion from the heating element 234. This thermal heating and thermal protrusion is intentional and is adjustable and controllable as discussed above. The dotted line 304 represents the thermal protrusion resulting from the near field transducer 226 that is used to heat the magnetic media. The protrusion from the near field transducer 226 is large enough to affect air bearing behavior. This can result in air pushback which can affect TFC actuation efficiency and bring some amount of uncertainty to spacing in the Heat Assisted Magnetic Recording (HAMR).

In FIG. 3, the dashed line 306 represents thermal protrusion resulting in heating of the write coil 222 during operation of the write element 204. This thermal protrusion is affected by the power supplied to the write coil and further complicates the thermal protrusion profile.

As discussed above, it is desirable to accurately control the thermal protrusion of the magnetic read/write head 200 in order to accurately control the fly height to maximize performance and prevent head media contact during operation. However, the ancillary effects of the NFT induced thermal protrusion and writer induced thermal protrusion make it difficult to determine the correct amount of power to be applied to the thermal fly height control (TFC) system. What's more, the amount of thermal protrusion from the NFT and the writer can vary between different data recording systems as a result of manufacturing variations and can also vary as a result of environmental factors such as ambient temperature and atmospheric pressure. The amount of protrusion from the NFT and writer can even vary over time as the data recording system ages. The clearance between the NFT and the magnetic media directly affects the amplitude of the recorded signal. However, the NFT is constructed in large part of gold (Au), which is very soft and which extends to the media facing surface. This makes the NFT especially vulnerable to any contact with the magnetic media during use. Such contact between the media and the NFT can render the NFT, and the entire magnetic data recording system, inoperable. Therefore, there is a need for a non-destructive method and means for accounting for such NFT and writer induced thermal protrusion at various operational conditions in various data recording systems and in a manner that does not result in damage to the data recording system.

In order to accurately account for Near Field Transducer (NFT) protrusion resulting from heating of the NFT itself, and also protrusion resulting from heating of the write element during use, a burst mode writing process can be used to determine a calibration curve that accurately determines the signal amplitude versus thermal fly height control power when operating without the extraneous protrusions from near field transducer heating or write element heating. The actual amount of protrusion during thermal steady state writing can then be determined and a thermal fly height control power can be adjusted to maintain a desired optimal fly height.

Figure 4:
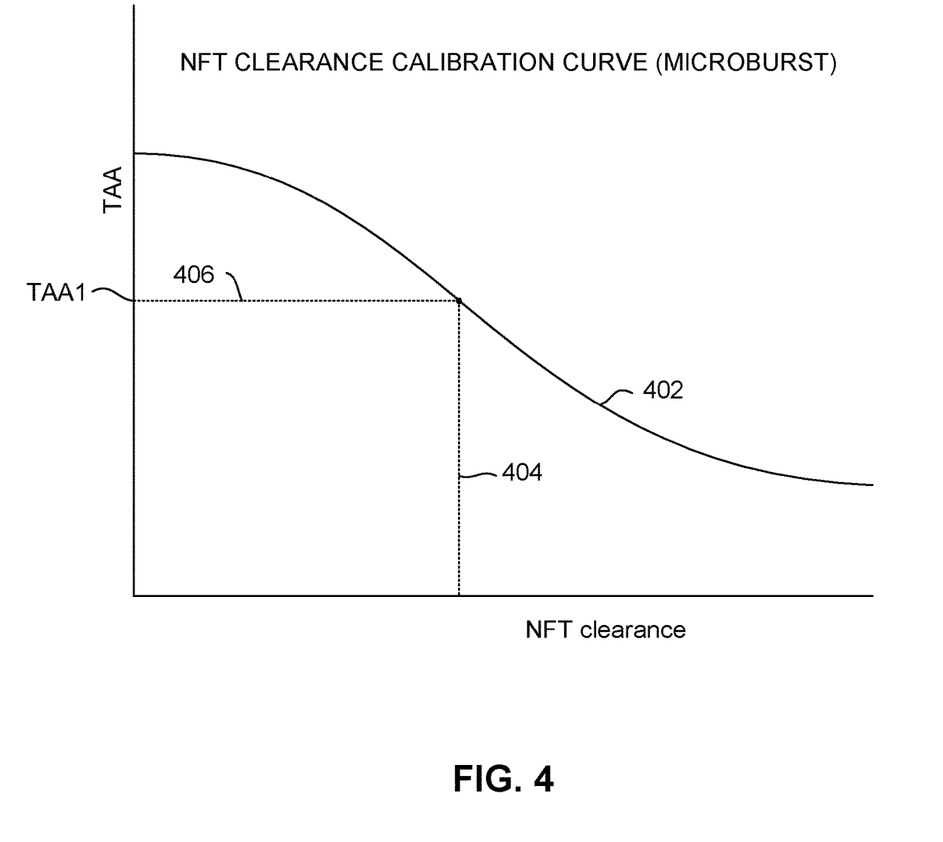
FIG. 4 is a graph showing a NFT clearance calibration curve obtained using burst writing.

FIG. 4 is a graph illustrating a near field transducer (NFT) calibration curve 402 obtained using microburst recording. The signal amplitude (TAA) is directly affected by the clearance between the NFT and the magnetic media. As the NFT gets closer to the media, the heating efficiency of NFT is enhanced. The number of grains that are magnetized increases, resulting in better writing quality as the NFT gets closer to the magnetic media.

To obtain the NFT clearance calibration curve 402 for microburst recording such as that shown in FIG. 4, a signal is written to the media at various thermal fly height control (TFC) power settings. The TFC power can be adjusted from zero power to at or near a touchdown point where head disk contact occurs. This writing is performed as a microburst. That is, the writing is performed for a duration that is sufficiently short that the NFT does not significantly heat up. In order to write to the media in a manner that correlates to normal operating conditions it is necessary to write at or close to normal operating laser power. However, to obtain the calibration curve it is also desirable to perform the writing without significant protrusion from NFT heating. In order to accomplish this, writing can be performed at very short duration burst.

The burst writing can be a writing that is performed for a short duration that is less than the NFT protrusion time constant. The NFT protrusion time constant is the time required for the near field transducer (NFT) to reach a thermal steady state. Preferably the burst writing can be performed for a duration that is about 10 percent of the NFT protrusion time constant or 5-15 percent of the NFT protrusion time constant. For example, the writing can be performed at a duration that is about 300 nanoseconds or 100-400 nanoseconds. The burst mode writing can also be performed for a duration that is less than the air bearing response time, which is the time required for the air bearing to reach steady state fly height.

In FIG. 4, the far right portion of the curve represents the condition where no power is supplied to the thermal fly height control (TFC), and the far left portion of the curve represents a condition at or near head disk contact (or touchdown). The relationship between TFC power and clearance is obtained using known TFC efficiency. The TFC efficiency can be used to convert TFC power to clearance. This can be used in burst mode, but is not valid in thermal steady state mode. A given desired clearance is represented by dotted line 404. This clearance corresponds to a desired target signal amplitude TAA1 at line 406. The writing used to derive the NFT clearance calibration curve 402 is performed at a fixed NFT power setting.

Figure 5:
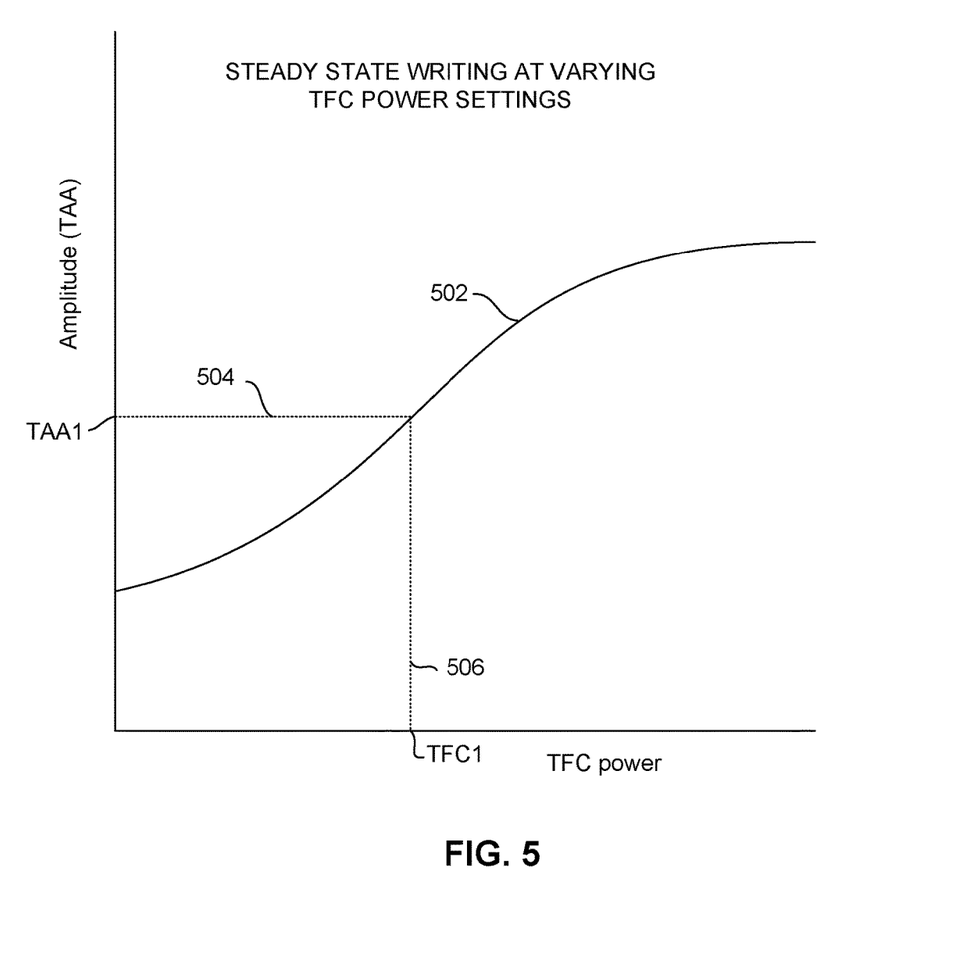
FIG. 5 is a graph showing a relationship between amplitude and TFC power for steady state writing.

FIG. 5 shows a curve 502 that represents the relationship between signal amplitude (TAA) and TFC power at steady state. In the graph of FIG. 5, line 504 correlates to the desired amplitude TAA1 previously defined with reference to the curve 402 of FIG. 4. At this amplitude TAA1, a corresponding TFC power setting TFC1 can be found at line 506.

At steady state recording, the TFC power is increased step by step until the desired amplitude TAA1 is reached, with the laser power (NFT power) at the same level as that used to obtain the curve 402 of FIG. 4. At the fixed laser power, when TAA reaches TAA1, the TFC power TFC1 is the TFC power needed to reach the desired target NFT clearance.

The above described process can be performed at different operating conditions, such as different temperatures and different laser diode powers (NFT powers). A lookup table can be compiled in order to optimize NFT clearance in real time for various operating temperatures in real time.

Figure 6:
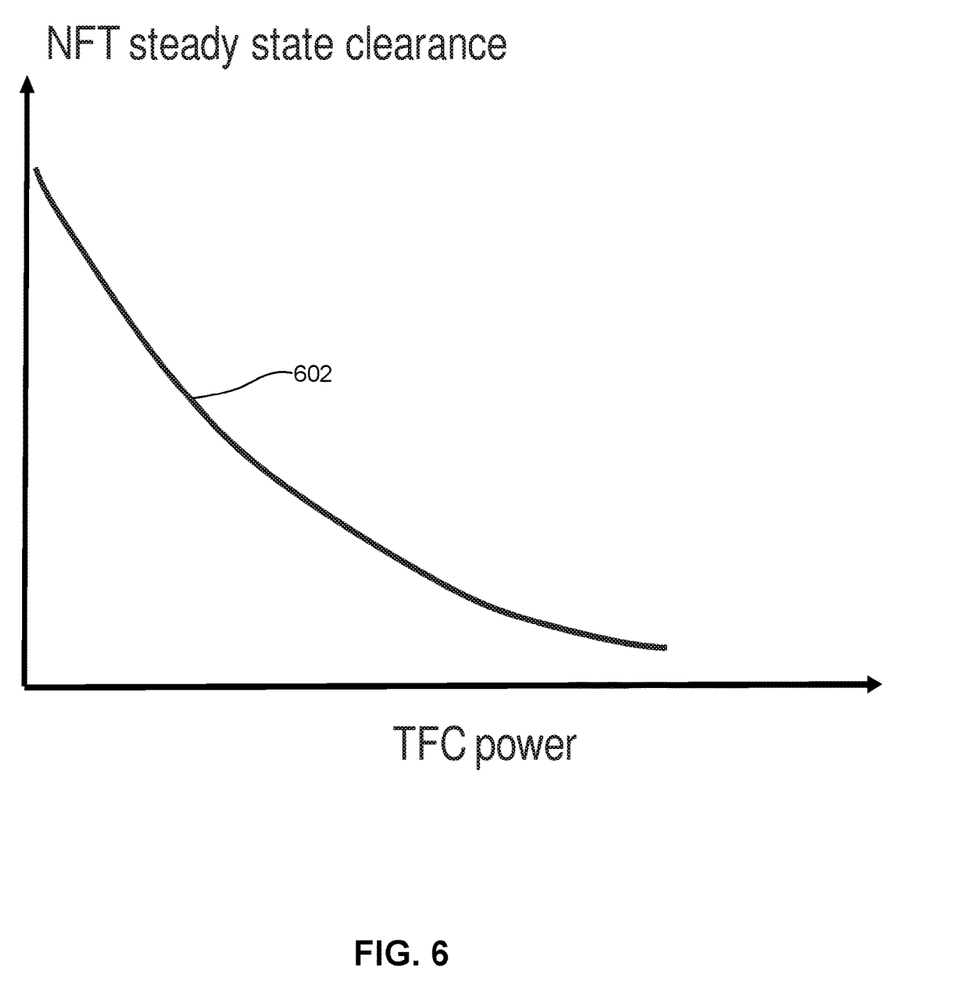
FIG. 6 is a graph showing a relationship between NFT clearance and TFC power.

In FIG. 6, curve 602 shows the relationship between NFT clearance at steady state and TFC power. This relationship can be found by knowing the relationship between amplitude TAA and TFC power as described above with reference to FIG. 5, since amplitude TAA is related to NFT clearance as described above with reference to FIG. 4. Using this data of FIG. 6, the TFC power needed to achieve any NFT clearance during actual operation can be determined. Therefore, the TFC power can be adjusted during operation to achieve any desired TFC clearance at a given set of operating parameters.

Figure 7:
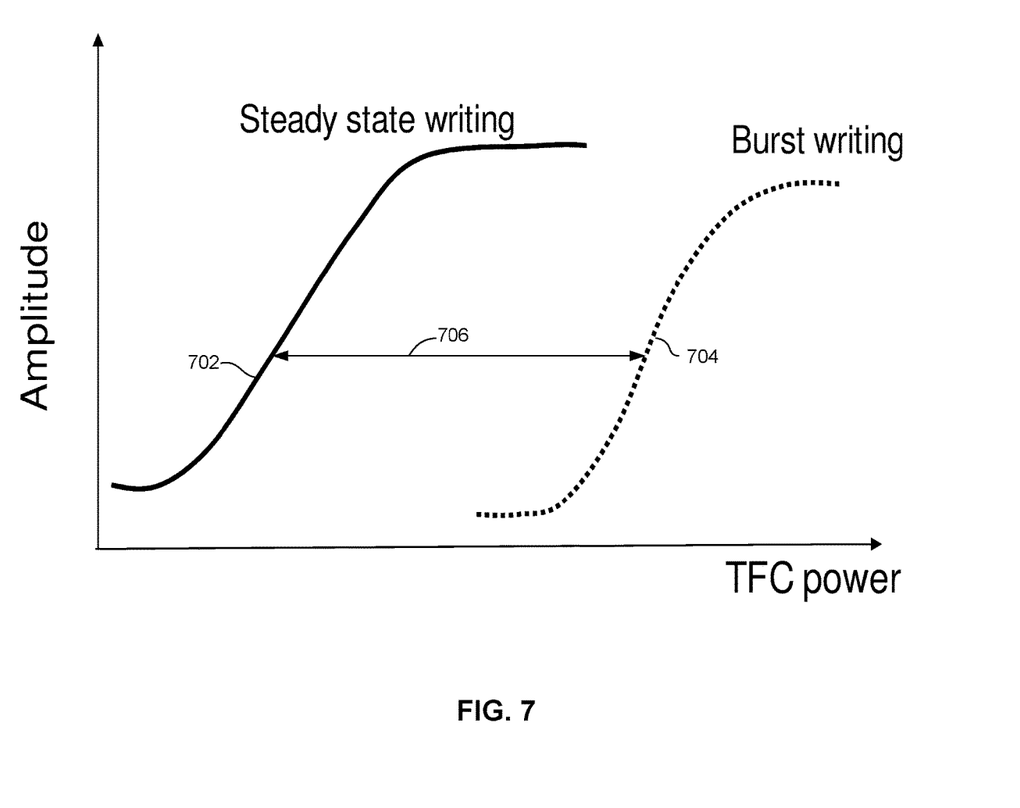
FIG. 7 is a graph showing a relationship between amplitude and TFC power for burst writing and steady state writing.

FIG. 7 shows two curves, both of which show the relationship between amplitude TAA and TFC power. Line 702 shows the relationship between amplitude (TAA) and TFC power for a write performed in burst mode (with negligible NFT heating induced protrusion). Line 704 shows the relationship between amplitude (TAA) and TFC power for a write performed at a thermal steady state condition. The difference in TFC power, or delta, between the two curves at a given, desired amplitude TAA1 is indicated by line 706.

Figure 9:
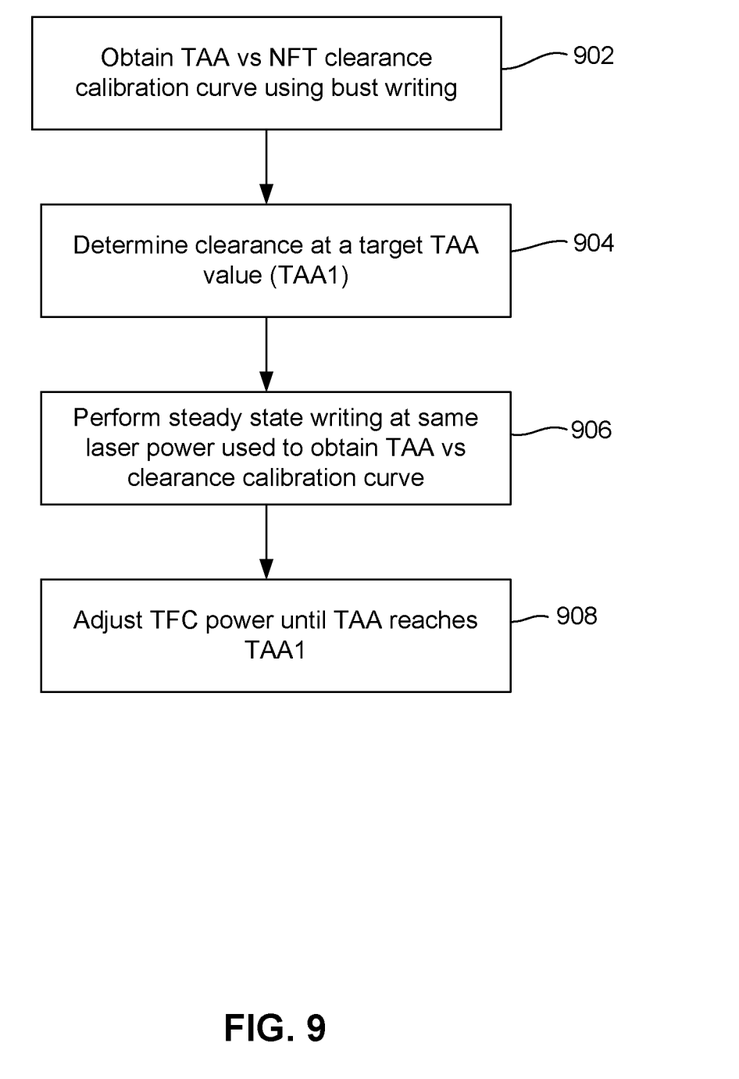
FIG. 9 flowchart illustrating a process for calibrating for NFT induced thermal protrusion.

FIG. 9 is a flowchart illustrating a method according to one possible embodiment for calibrating for NFT protrusion and adjusting TFC power to optimize NFT clearance, such as described above. In a step 902 a TAA verses NFT clearance curve is obtained using burst writing. As discussed above burst writing is writing that is performed for a duration that is sufficiently short that the NFT does not significantly heat up. The burst writing can be a writing that is performed for a short duration that is less than the NFT protrusion time constant. The NFT protrusion time constant is the time required for the near field transducer (NFT) to reach a thermal steady state. Preferably the burst writing can be performed for a duration that is about 10 percent of the NFT protrusion time constant or 5-15 percent of the NFT protrusion time constant. For example, the writing can be performed at a duration that is about 300 nanoseconds or 100-400 nanoseconds. The burst mode writing can also be performed for a duration that is less than the air bearing response time, which is the time required for the air bearing to reach steady state fly height. The burst writing is performed at various TFC powers, and can be performed over a range of zero TFC power to at or near a touchdown point.

Then, in a step 904, an amplitude value (TAA1) is determined for a target NFT clearance. This target clearance can be an NFT clearance that provides a desired balance between maximizing recording performance and minimizing the chances of head/disk contact during operation.

Then, in a step 906 writing is performed at a thermal steady state at the same NFT power (laser power) used in step 902. This writing can be performed at various TFC power settings to obtain a TAA verses clearance curve for steady state writing. Steady state writing can be, for example 100 microseconds or longer. In a step 908, the TFC power can be adjusted until the desired amplitude value TAA1 has been reached. This corresponds to the desired NFT clearance obtained using burst writing, but at a lower TFC power needed to achieve that same clearance in a steady state writing mode.

The above description illustrates how a magnetic data recording system can be calibrated to adjust for NFT protrusion using burst writing. A similar process can be used to compensate for writer induced protrusion. As described above, current flow through the write coil 222 (FIGS. 2 and 3) causes Joule heating that can result in thermal protrusion of the write pole and surrounding structure. This protrusion is extraneous and in addition to the desired amount of thermal protrusion from the TFC heater 234 (FIGS. 2 and 3).

Figure 10:
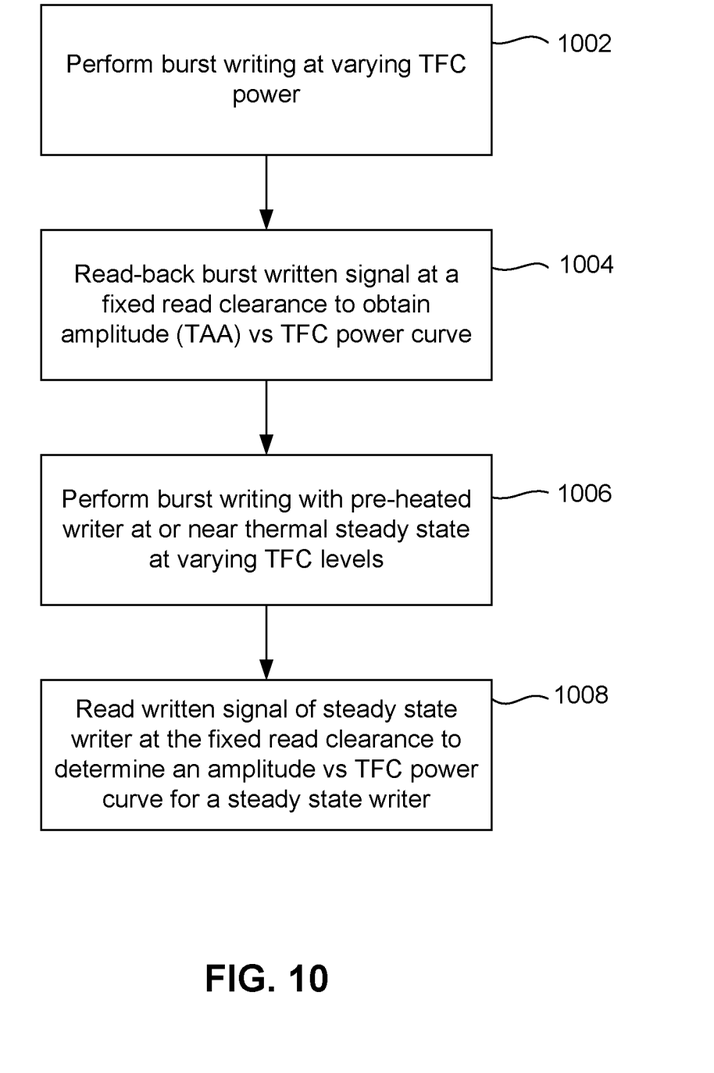
FIG. 10 is a flowchart illustrating a process for calibrating for writer induced thermal protrusion.

A method for calibrating thermal fly height for writer induced thermal protrusion is described with reference to FIG. 10. First, in a step 1002, burst writing is performed at various TFC power settings. Each burst mode writing is performed for a duration that is sufficiently short that it does not result in significant heating of either the NFT or the writer itself. The burst writing can be a writing that is performed for a short duration that is less than the NFT protrusion time constant. The NFT protrusion time constant is the time required for the near field transducer (NFT) to reach a thermal steady state. Preferably the burst writing can be performed for a duration that is about 10 percent of the NFT protrusion time constant or 5-15 percent of the NFT protrusion time constant. For example, the writing can be performed for a duration that is about 300 nanoseconds or 100-400 nanoseconds. The burst mode writing can also be performed for a duration that is less than the air bearing response time, which is the time required for the air bearing to reach steady state fly height.

Then, in a step 1004 the signals written at different TFC powers are read back to obtain a calibration curve (TAA verses TFC power) similar to that of FIG. 4. This read back of written signals is preferably performed at a constant clearance (i.e. constant TFC power) during reading.

Then, in a step 1006, a series of burst writings are performed with the writer pre-heated. Each writing performed such that the write gate is opened (e.g. the writer is activated) prior to activating the NFT. Pre-heating the writer element allows the write element to reach a steady state thermal protrusion before activating the Near Field Transducer (NFT) and laser. Therefore, the data writing does not actually start until after the writer has reached a thermal steady state. The time between activating the writer and activating the NFT can be a duration sufficiently long that the writer protrusion can reach a thermal steady state. These writer pre-heated burst writings can be performed at various TFC power settings.

Then, in a step 1008, the signals written in step 1006 can be read back to determine an amplitude versus TFC power for a fully heated writer. This series of burst writings can be used to determine an amplitude TAA for fully heated writer (steady state writer protrusion), but without NFT heating induced protrusion. Again, the read back can be performed at a constant read back fly height at a constant TFC power condition.

Figure 8:
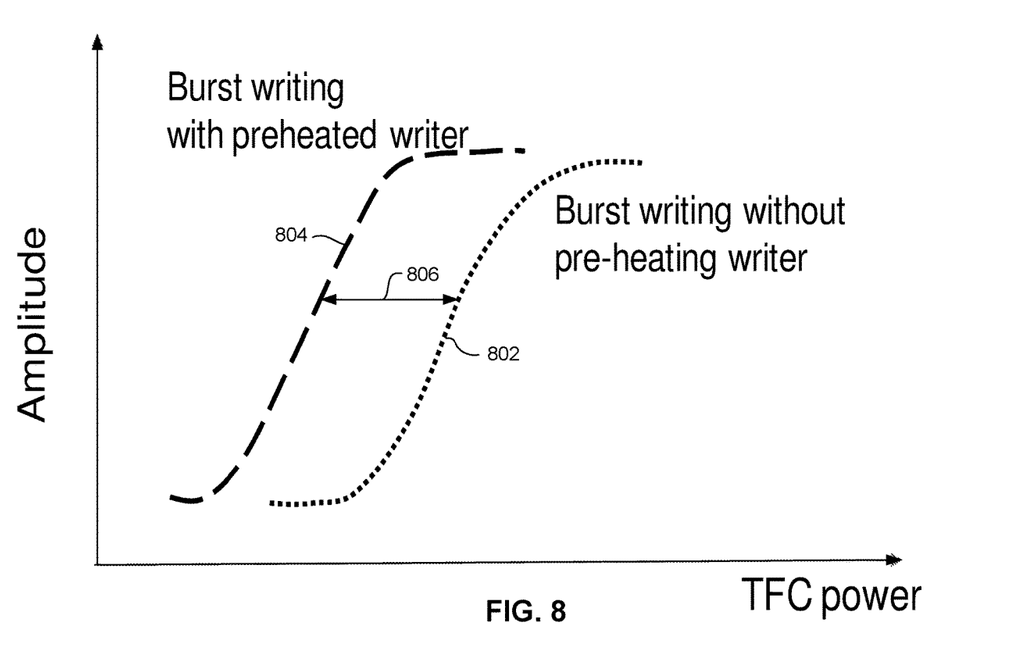
FIG. 8 is a graph showing a relationship between amplitude and TFC power for recording for burst writing and for burst writing with a pre-heated writer.

The above process can be used to calibrate TFC power for writer induced protrusion. FIG. 8 shows a graph of signal amplitude verses TFC power. Curve 802 shows the relationship between amplitude and TFC power for a burst writing without pre-heating the writer. This is the curve for a condition with no writer induced protrusion. The curve 804 shows the relationship between amplitude TAA and TFC power for a writer that has been pre-heated. This is the case with writer induced protrusion at steady state. The line 806 indicated the difference (delta) between the TFC powers for pre-heated and unheated writers at a given desired amplitude setting TAA1.

Figure 11:
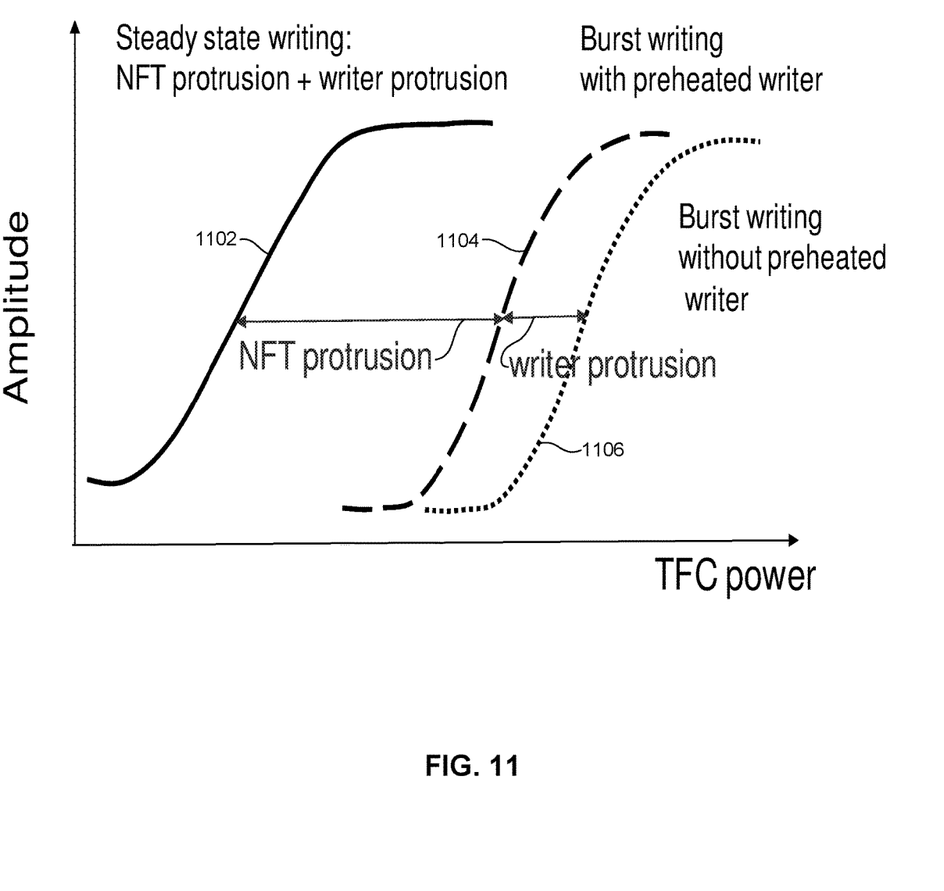
FIG. 11 is a graph showing relationships between amplitude and TFC power for steady state writing, burst writing with a pre-heated writer and burst writing without a pre-heated writer.

FIG. 11, shows amplitude verses TFC power curves for all three conditions, to show the combined effects of NFT induced thermal protrusion and writer induced thermal protrusion. Curve 1102 shows the relationship between amplitude and TFC power for a write head in normal operational conditions, with writer induced thermal protrusion and NFT induced thermal protrusion in addition to TFC induced thermal protrusion. Curve 1104 shows the relationship between amplitude and TFC power for a write head having writer induced thermal protrusion and TFC induced protrusion, but with no NFT induced thermal protrusion. This is the curve obtained using burst writing with a pre-heated writer element. Curve 1106 shows the relationship between amplitude and TFC power for the case where there is TFC induced thermal protrusion, but with no writer induced thermal protrusion and no NFT induced thermal protrusion. This is the curve that can be obtained using bursts writing and with no writer pre-heating.

While various embodiments have been described above, it should be understood that they have been presented by way of example only and not limitation. Other embodiments falling within the scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A method for magnetic data recording, comprising:
   performing a first series of writings to a magnetic media using a magnetic head that includes a magnetic write element, a thermal fly height control element, and a near field transducer, the first series of writings being performed at different thermal fly height control element powers, the first series of writings being performed in a burst writing mode;
   generating a calibration curve based on the first series of writings;
   performing a second series of writings to the magnetic media, the second series of writings being performed in a thermal steady state writing mode; and
   adjusting power supplied to the thermal fly height control element based on the first and second series of writings and the calibration curve to obtain a desired fly height in the thermal steady state writing mode.

2. The method as in claim 1, wherein the near field transducer has a thermal protrusion time constant and wherein each writing of the first series of writings is performed for a duration that is less than the thermal protrusion time constant.

3. The method as in claim 1, wherein the near field transducer has a thermal protrusion time constant and wherein each writing of the first series of writings is performed for a duration that is less than 10% of the thermal protrusion time constant.

4. The method as in claim 1, wherein the near field transducer has a thermal protrusion time constant and wherein each writing of the first series of writings is performed for a duration that is between 5%-15% of the thermal protrusion time constant.

5. The method as in claim 1, wherein the magnetic head has an air bearing response time and wherein each writing of the first series of writings is performed for a duration that is less than the air bearing response time.

6. The method as in claim 1, wherein each of the first series of writings is performed for a duration less than 300 ns.

7. The method as in claim 1, wherein each of the first series of writings is performed for a duration between 100-400 ns.

8. The method as in claim 1, wherein the calibration curve indicates a relationship between signal amplitudes of the first series of writings recorded on the magnetic media and corresponding fly heights of the magnetic head, the method further comprising determining a desired target signal amplitude that corresponds to the desired fly height, and wherein the adjustment of the power supplied to the thermal fly height control element is performed to achieve the desired target signal amplitude in the thermal steady state writing mode.

9. The method as in claim 1, wherein the calibration curve indicates a relationship between signal amplitudes of the first series of writings recorded on the magnetic media and corresponding fly heights of the magnetic head for writing in the burst writing mode.

10. The method as in claim 1, wherein a fly height corresponding to a signal amplitude includes a clearance between the near field transducer and the magnetic media.

11. The method as in claim 1, further comprising:
determining a relationship between signal amplitudes of the first series of writings recorded on the magnetic media and corresponding near field transducer clearances of the magnetic head in the burst writing mode; and
determining a desired target signal amplitude that corresponds with a desired near field transducer clearance,
wherein the adjustment of the power supplied to the thermal fly height control element is performed to achieve the desired target signal amplitude in the thermal steady state writing mode.

12. A method for calibrating fly height in a magnetic data recording system, comprising:
performing burst mode magnetic writing to a magnetic media using a magnetic head that includes a near field transducer and a thermal fly height control element in a burst writing mode;
determining a relationship between signal amplitudes of the burst mode magnetic writing on the magnetic media and corresponding near field transducer clearances in the burst writing mode;
determining a desired target signal amplitude that corresponds to a desired near field transducer clearance in the burst writing mode based on the determined relationship; and
adjusting power supplied to the thermal fly height control element to achieve the desired target signal amplitude for writing in a thermal steady state mode.

13. The method as in claim 12, wherein the near field transducer has a thermal protrusion time constant, and wherein the burst mode magnetic writing comprises writing for a duration that is less than the thermal protrusion time constant.

14. The method as in claim 12, wherein the near field transducer has a thermal protrusion time constant, and wherein the burst mode magnetic writing comprises writing for a duration that is less than 10% of the thermal protrusion time constant.

15. The method as in claim 12, wherein the near field transducer has a thermal protrusion time constant and wherein the burst mode magnetic writing is performed for a duration that is between 5%-15% of the thermal protrusion time constant.

16. The method as in claim 12, wherein the magnetic head has an air bearing response time and wherein the burst mode magnetic writing is performed for a duration that is less than the air bearing response time.

17. The method as in claim 12, wherein the burst mode magnetic writing is performed for a duration less than 300 ns.

18. The method as in claim 12, wherein the burst mode magnetic writing is performed for a duration between 100-400 ns.

19. A magnetic data recording system, comprising:
a magnetic media;
a magnetic recording head configured to write magnetic signals to the magnetic media, the magnetic recording head including a write element, wherein the write element includes a thermal fly height control element and a near field thermal transducer;
circuitry for recording the magnetic signals to the magnetic media in a burst writing mode;
circuitry for determining a relationship between signal amplitudes of the magnetic signals recorded on the magnetic media and corresponding near field transducer clearances in the burst writing mode;
circuitry for determining a desired target signal amplitude corresponding to a desired near field transducer clearance in the burst writing mode, based on the determined relationship; and
circuitry for adjusting power supplied to the thermal fly height control element to achieve the desired target signal amplitude when recording in a thermal steady state mode.

20. The magnetic data recording system as in claim 19, wherein the near field thermal transducer has a thermal protrusion time constant and wherein the recording of the magnetic signals in the burst writing mode is performed for a duration that is less than 10% of the thermal protrusion time constant.

21. The magnetic data recording system as in claim 19, wherein the recording of the magnetic signals in the burst writing mode is performed for a duration less than 300 ns.

22. The magnetic data recording system as in claim 19, wherein the recording of the magnetic signals in the burst writing mode is performed for a duration between 100-400 ns.

23. A magnetic data recording system, comprising:
a magnetic media;
a magnetic recording head configured to write magnetic signals to the magnetic media, the magnetic recording head including a write element, wherein the write element includes a thermal fly height control element and a near field thermal transducer;
means for recording the magnetic signals to the magnetic media in a burst writing mode;
means for determining a relationship between signal amplitudes of the magnetic signals recorded on the magnetic media and corresponding near field transducer clearances in the burst writing mode;

means for determining a desired target signal amplitude corresponding to a desired near field transducer clearance in the burst writing mode, based on the determined relationship; and means for adjusting power supplied to the thermal fly height control element to achieve the desired target signal amplitude when recording in a thermal steady state mode.

24. The magnetic data recording system as in claim 23, wherein the near field transducer has a thermal protrusion time constant, and wherein the recording of the magnetic signals in the burst writing mode is performed for a duration that is less than the thermal protrusion time constant.

25. The magnetic data recording system as in claim 23, wherein the near field transducer has a thermal protrusion time constant, and wherein the recording of the magnetic signals in the burst writing mode is performed for a duration that is less than 10% of the thermal protrusion time constant.

26. The magnetic data recording system as in claim 23, wherein the near field transducer has a thermal protrusion time constant and wherein the recording of the magnetic signals in the burst writing mode is performed for a duration that is between 5%-15% of the thermal protrusion time constant.

27. The magnetic data recording system as in claim 23, wherein the magnetic recording head has an air bearing response time and wherein the recording of the magnetic signals in the burst writing mode is performed for a duration that is less than the air bearing response time.

28. The magnetic data recording system as in claim 23, wherein the recording of the magnetic signals in the burst writing mode is performed for a duration less than 300 ns.

29. The magnetic data recording system as in claim 23, wherein the recording of the magnetic signals in the burst writing mode is performed for a duration between 100-400 ns.

30. A magnetic data recording system, comprising:
a magnetic recording head configured to write magnetic signals to a magnetic media, the magnetic recording head including a write element, wherein the write element includes a thermal fly height control element and a near field thermal transducer;
circuitry for recording the magnetic signals to the magnetic media in a burst writing mode;
circuitry for determining a relationship between signal amplitudes of the magnetic signals recorded on the magnetic media and corresponding near field transducer clearances in the burst writing mode;
circuitry for determining a desired target signal amplitude corresponding to a desired near field transducer clearance in the burst writing mode, based on the determined relationship; and
circuitry for adjusting power supplied to the thermal fly height control element to achieve the desired target signal amplitude when recording in a thermal steady state mode.

31. The magnetic data recording system as in claim 30, wherein the near field thermal transducer has a thermal protrusion time constant and wherein the the recording of the magnetic signals in the burst writing mode is performed for a duration that is less than the thermal protrusion time constant.

32. The magnetic data recording system as in claim 30, wherein the near field thermal transducer has a thermal protrusion time constant and wherein the the recording of the magnetic signals in the burst writing mode is performed for a duration that is between 5-15 percent of the thermal protrusion time constant.

33. The magnetic data recording system as in claim 30, wherein the magnetic recording head has an air bearing response time and wherein the magnetic signals are recorded for a duration that is less than the air bearing response time.

34. A method for calibrating for thermal protrusion in a magnetic data recording system, the method comprising:
performing a first series of writings to a magnetic media, using a magnetic recording head that includes a read element, a write element, a thermal fly height control element, and a near field transducer, the first series of writings being performed at a first range of varying levels of thermal fly height control power, the first series of writings being performed in a burst writing mode such that neither the near field transducer nor the write element is in a thermal steady state;
determining a relationship between signal amplitudes of the first series of writings recorded on the magnetic media and corresponding fly heights, based on the first series of writings;
selecting a desired target signal amplitude that corresponds to a desired fly height based on the determined relationship;
performing a second series of writings at a second range of varying levels of the thermal fly height control power, the second series of writings being performed in the burst writing mode with the write element being preheated at the second range of varying levels of the thermal fly height control power;
performing a third series of writings at a third range of varying levels of the thermal fly height control power, the third series of writings being performed with both the near field transducer and the write element being at the thermal steady state in a thermal steady state writing mode; and
adjusting the thermal fly height control power supplied to the thermal fly height control element to achieve the desired target signal amplitude in the thermal steady state writing mode.

35. The method as in claim 34, wherein the near field transducer has a thermal protrusion time constant and wherein the first series of writings in the burst writing mode is performed with the near field transducer activated for a duration that is less than the thermal protrusion time constant.

36. The method as in claim 34, wherein the second series of writings is performed with the write element being preheated by starting operation of the write element prior to activating the near field transducer.

* * * * *